(12) United States Patent
Brosnan et al.

(10) Patent No.: US 9,424,601 B2
(45) Date of Patent: Aug. 23, 2016

(54) METHOD, COMPUTER PROGRAM PRODUCT, AND SYSTEM FOR PROVIDING A SENSOR-BASED ENVIRONMENT

(71) Applicant: Toshiba Global Commerce Solutions Holdings Corporation, Tokyo (JP)

(72) Inventors: Susan Winter Brosnan, Raleigh, NC (US); Daniel Robert Goins, Wake Forest, NC (US); Patricia Stephany Hogan, Raleigh, NC (US); David Christopher Klages, Morrisville, NC (US); Jessica Suzanne King Snead, Cary, NC (US)

(73) Assignee: TOSHIBA GLOBAL COMMERCE SOLUTIONS HOLDINGS CORPORATION, Tokyo (JP)

( * ) Notice: Subject to any disclaimer, the term of this patent is extended or adjusted under 35 U.S.C. 154(b) by 0 days.

(21) Appl. No.: 14/673,390

(22) Filed: Mar. 30, 2015

(65) Prior Publication Data
US 2016/0110797 A1 Apr. 21, 2016

Related U.S. Application Data

(60) Provisional application No. 62/064,323, filed on Oct. 15, 2014.

(51) Int. Cl.
*G06Q 30/06* (2012.01)
*G06K 9/78* (2006.01)
(Continued)

(52) U.S. Cl.
CPC .............. *G06Q 30/0633* (2013.01); *G06K 9/46* (2013.01); *G06K 9/6201* (2013.01); *G06K 9/78* (2013.01); *G06K 2209/17* (2013.01)

(58) Field of Classification Search
CPC .............. G07G 1/0063; G07G 1/0036; G06K 2209/17; G06K 9/46; G06K 9/78; G06K 9/6201; G06Q 20/208; G06Q 30/0633
USPC ........................................................ 235/383
See application file for complete search history.

(56) References Cited

U.S. PATENT DOCUMENTS

| 4,327,819 | A | 5/1982 | Coutta |
| 5,485,006 | A | 1/1996 | Allen et al. |

(Continued)

FOREIGN PATENT DOCUMENTS

WO 94/17700 A1 8/1994

OTHER PUBLICATIONS

Hakeem et al.: "Video Analytics for Business Intelligence", http://link.springer.com/book/10.1007%2F978-3-642-28598-1, 2012.

*Primary Examiner* — Thien M Le
*Assistant Examiner* — Claude J Brown
(74) *Attorney, Agent, or Firm* — Patterson + Sheridan, LLP

(57) ABSTRACT

Method, computer program product, and system to facilitate a checkout transaction for a person within an environment having a plurality of items. The method includes determining, using a visual sensor disposed within the environment, image information associated with the person. The method further includes analyzing the image information to identify one or more of the plurality of items that are selected by the person to be presented during the checkout transaction. In some cases, the method also includes determining whether the identified items belong to a predetermined class of items deemed to be "difficult." The method further includes determining, based on the one or more identified items, a level of assistance to provide to the person during the checkout transaction.

20 Claims, 11 Drawing Sheets

(51) Int. Cl.
 *G06K 9/46* (2006.01)
 *G06K 9/62* (2006.01)
 *G06K 15/00* (2006.01)

(56) References Cited

U.S. PATENT DOCUMENTS

| | | | |
|---|---|---|---|
| 5,497,314 A * | 3/1996 | Novak | A47F 9/046 235/383 |
| 5,910,769 A | 6/1999 | Geisler | |
| 6,412,694 B1 * | 7/2002 | Kumar | G06K 7/10861 235/462.01 |
| 7,219,838 B2 | 5/2007 | Brewster et al. | |
| 7,909,248 B1 * | 3/2011 | Goncalves | G07G 1/0063 235/375 |
| 8,132,725 B2 | 3/2012 | Kundu et al. | |
| 8,146,811 B2 | 4/2012 | Kundu et al. | |
| 8,448,859 B2 | 5/2013 | Goncalves et al. | |
| 8,538,820 B1 | 9/2013 | Migdal et al. | |
| 8,571,298 B2 * | 10/2013 | McQueen | G06K 9/00 235/378 |
| 8,639,543 B2 | 1/2014 | Boss et al. | |
| 8,794,524 B2 * | 8/2014 | Connell, II | G06K 7/10554 235/462.01 |
| 2005/0189412 A1 * | 9/2005 | Hudnut | A47F 9/046 235/383 |
| 2005/0283402 A1 * | 12/2005 | Mason | A47F 9/046 705/16 |
| 2008/0218591 A1 | 9/2008 | Heier et al. | |
| 2009/0039165 A1 | 2/2009 | Collins, Jr. et al. | |
| 2009/0125406 A1 * | 5/2009 | Lewis | G06Q 20/208 705/23 |
| 2011/0036907 A1 * | 2/2011 | Connelly | B62B 3/148 235/383 |
| 2011/0231331 A1 * | 9/2011 | Smith | G06Q 30/0281 705/325 |
| 2012/0233003 A1 * | 9/2012 | Calman | G06Q 30/06 705/16 |
| 2013/0182114 A1 | 7/2013 | Zhang et al. | |
| 2014/0365273 A1 * | 12/2014 | Hurewitz | G06Q 30/0643 705/7.29 |
| 2014/0367466 A1 * | 12/2014 | Pai | G06Q 30/0641 235/383 |
| 2015/0012396 A1 | 1/2015 | Puerini et al. | |
| 2015/0019391 A1 | 1/2015 | Kumar et al. | |
| 2015/0029339 A1 * | 1/2015 | Kobres | G06Q 30/00 348/150 |
| 2015/0332242 A1 * | 11/2015 | Perry | G06Q 20/206 705/18 |

\* cited by examiner

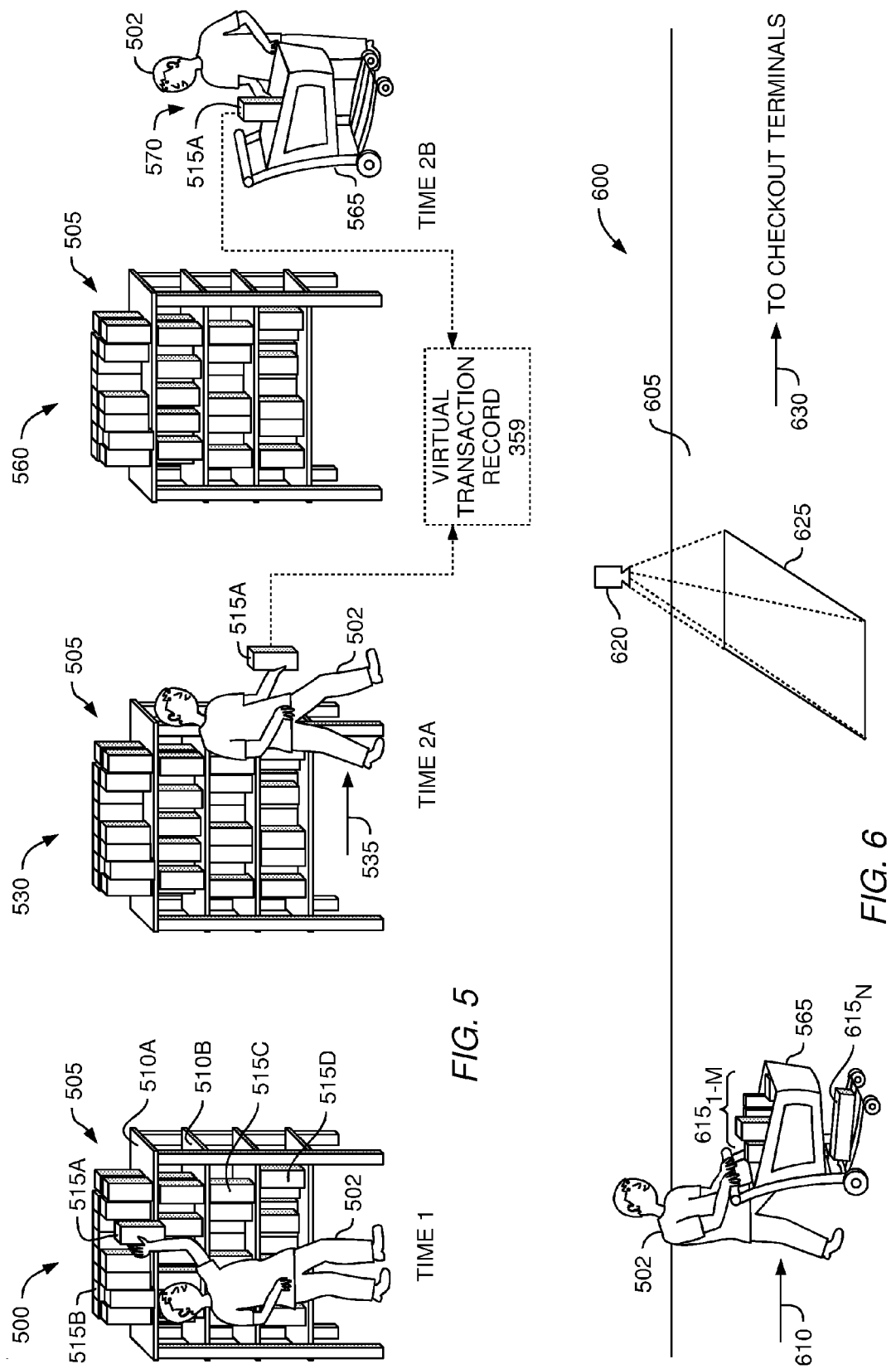

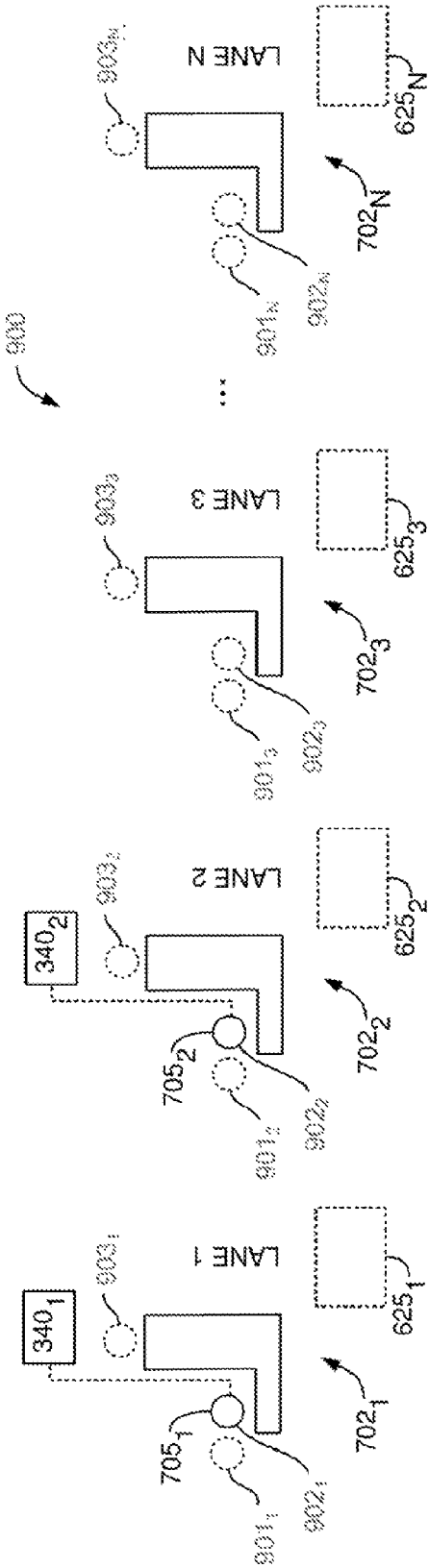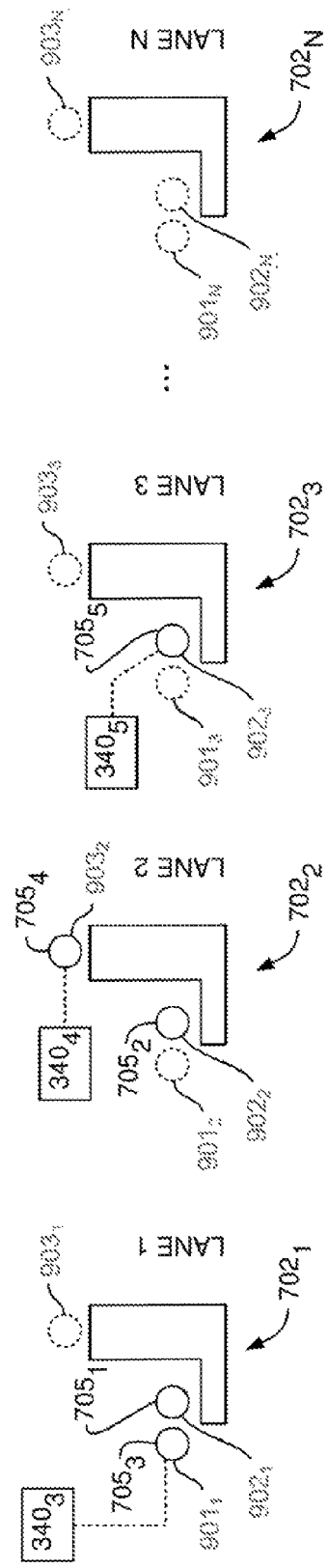
FIG. 9

METHOD, COMPUTER PROGRAM PRODUCT, AND SYSTEM FOR PROVIDING A SENSOR-BASED ENVIRONMENT

CROSS-REFERENCE TO RELATED APPLICATIONS

This application claims benefit of U.S. provisional patent application Ser. No. 62/064,323, filed Oct. 15, 2014, entitled "Integrated Shopping Environment," which is herein incorporated by reference.

BACKGROUND

The present disclosure relates to a sensor-based environment, and more specifically, to providing an adaptive personalized experience within such an environment using a determined level of difficulty of completing a checkout transaction.

BRIEF DESCRIPTION OF THE SEVERAL VIEWS OF THE DRAWINGS

FIGS. 5 and 6 illustrate exemplary selections of items to be presented during a checkout transaction, according to one or more embodiments.

FIG. 9 illustrates exemplary assignment distributions, according to one embodiment.

Figure 1:
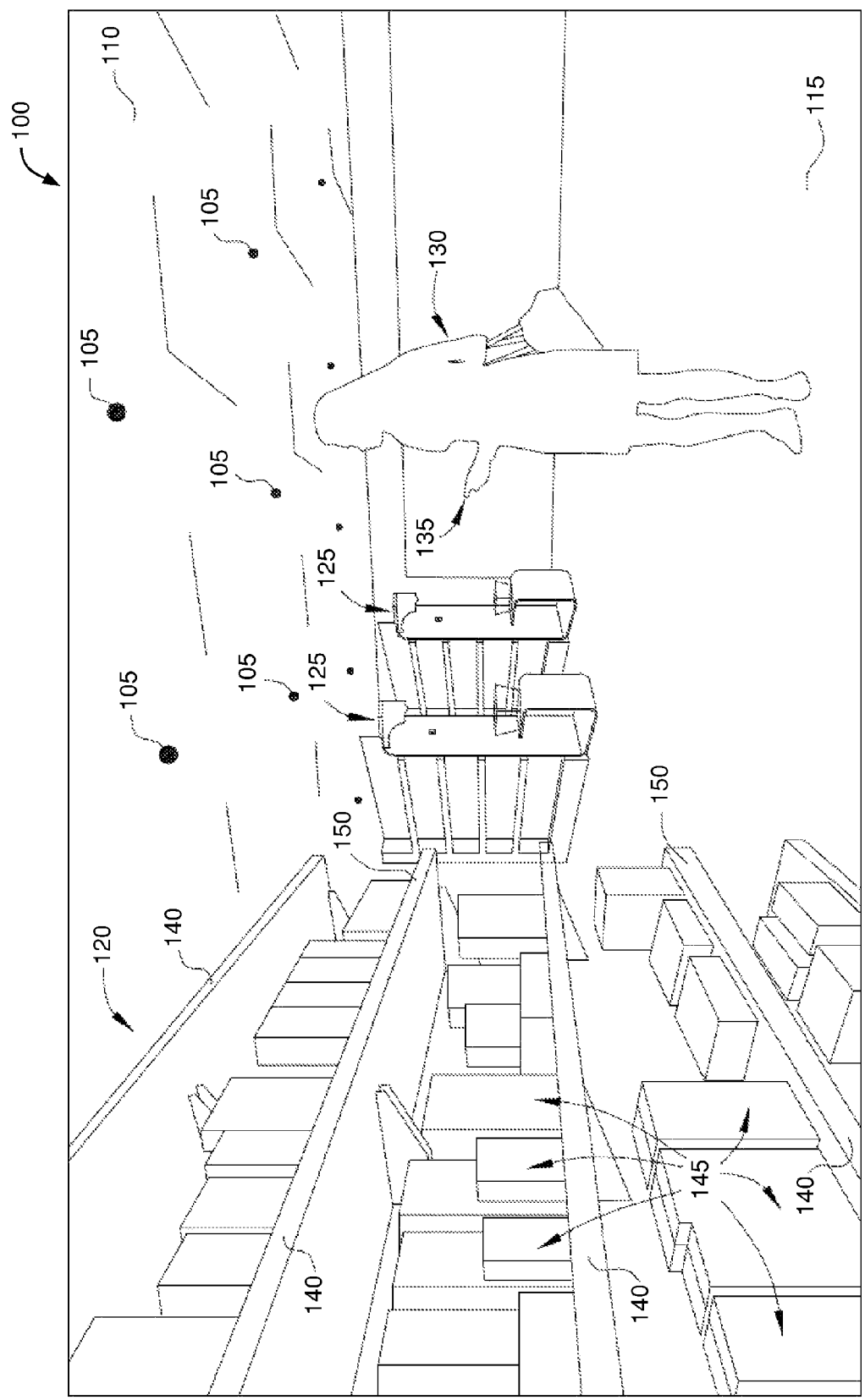
FIG. 1 illustrates an exemplary environment including a plurality of items, according to one embodiment.

To facilitate understanding, identical reference numerals have been used, where possible, to designate identical elements that are common to the figures. It is contemplated that elements disclosed in one embodiment may be beneficially utilized on other embodiments without specific recitation. The illustrations referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

Aspects of the current disclosure relate to an integrated environment capable of providing a personalized, automated, and adaptive experience for a person within the environment. A number of different sensor devices may be employed within the environment, and networked with various computing devices such as point-of-sale (POS) terminals, digital signage, servers, and mobile or handheld computing devices to provide a seamless integration of mobile technologies and e-commerce into traditional experiences.

Using a system having one or more visual sensors within the environment, a retailer or other provider may compile and process environmental data to identify various items that have been selected by a person for presentation during a subsequent checkout transaction. The identification of the items may be based on an analysis of static imagery, such as an image of the person's shopping cart at a particular time. The identification may also be based on determined actions of the person, such as handling the item, placing the item in a shopping receptacle, walking away from the item's original location with the item, etc. The identification may occur at the point of selection, such as shelving units that display the items, or at other designated areas within the environment. The system uses the identified items to determine a level of difficulty of the checkout transaction, which may be based on one or more predetermined classes of items deemed to be difficult and/or difficulty scores for the items. The system assesses the proficiency of the employees assigned to the checkout area and/or the proficiency of the person to determine whether the checkout transaction can be completed according to transaction goals, e.g., with few errors, in less than a particular amount of time, and so forth. Based on the determination, the system may determine whether to provide additional assistance for the person's checkout transaction, which can include determining an updated distribution of personnel assignments (such as by moving an employee already assigned to the checkout, by assigning additional employees to the checkout, etc.).

By adaptively determining an amount of assistance to provide to a person during the checkout transaction, a retailer may streamline operations around the POS to support greater customer throughput, as well as provide an improved experience for the customers. The retailer may also compile valuable data on employee performance, identifying strengths and deficiencies to support employee training and development programs. While generally discussed within the context of a shopping environment, such as a retail store or other commercial environment, it is contemplated that the techniques disclosed herein may be applied to other environments (some non-limiting examples include libraries, museums, classrooms, hospitals, etc.) to provide a similar experience for persons included therein.

FIG. 1 illustrates an exemplary environment including a plurality of items, according to one embodiment. The environment 100 includes a plurality of sensor modules 105 disposed in the ceiling 110 of the environment. The sensor modules 105 may each include one or more types of sensors, such as video sensors (e.g., cameras), audio sensors (e.g., microphones), and so forth. Sensor modules 105 may also include actuating devices for providing a desired position and/or orientation of the included sensor(s). Generally, the sensor modules or individual sensors may be disposed at any suitable location within the environment 100. Some non-limiting examples of alternative locations include below, within, or above a floor 115 of the environment, within other structural components of the environment 100 such as a shelving unit 120 or walls, and so forth. In some embodiments, sensors may be disposed on, within, or near item display areas such as the shelving unit 120. The sensors may be oriented toward expected locations of personal interactions with items in order to acquire better data about the person's interactions, such as determining the person's field of view relative to certain items, updating a virtual cart or transaction record for the person's transaction in the environment, and so forth.

Environment 100 also includes a number of computer-based terminals (or kiosks) 125. Generally, terminals 125 may be configured for performing customer checkout and/or other functions, such as providing information to a customer or employee. Each terminal 125 may each include a discrete computing device or portions of a computing system, and may include various I/O devices, such as visual displays, audio speakers, cameras, microphones, etc. for interacting with various persons such as customers and/or employees. In some embodiments, a person 130 in the environment may have a mobile computing device, such as a smartphone 135, that communicatively couples with the terminal 125 for completing a checkout transaction. For example, the person's smartphone 135 may include payment information, identification information, etc. that facilitate completion of the checkout transaction. In one embodiment, the mobile computing device may execute a store application that connects with the computing system of the environment (e.g., to store servers or other computing devices through the Internet). In one embodiment, the mobile computing device may be directly connected with kiosk 125 through wireless networks established within the environment (e.g., over Wi-Fi or Bluetooth). In one embodiment, the mobile computing device may couple with the kiosk 125 when brought within range, e.g., using Bluetooth or near-field communication (NFC).

Environment 100 also includes one or more shelving units 120 having shelves 140 that support various store items 145. Though not shown, multiple shelving units 120 may be disposed in a particular arrangement in the environment 100, with the space between adjacent shelving units forming aisles through which customers and employees may travel. For example, customers may navigate the aisles and/or approach the shelving units 120 to view items 145 included therein, to handle the items, to select the items, etc. In another example, employees may navigate the aisles and/or approach the shelving units 120 to view stock levels of the items 145, to determine out-of-place items, etc. In some embodiments, shelving units 120 may include visual sensors or other sensor devices or I/O devices. The sensors or devices may couple with the person's smartphone 135 and/or other networked computing devices (including terminals 125 and/or servers) that are associated with the environment 100. For example, the front portions 150 of shelves 140 may include video sensors oriented outward from the shelving unit 120 (i.e., toward the aisle) to acquire image information for a person's interactions with items 145 on the shelving unit 120, with the image information provided to back-end servers for storage and/or analysis. In some cases, some or all of the image information may also be accessible by a person's mobile computing device. In some embodiments, portions of the shelving unit 120 (such as the front portions 150 of shelves 140) may include indicator lights or other visual display devices or audio output devices that are able to communicate with a person.

During an exemplary transaction in the environment, the person 130 may have a shopping receptacle in which the person places items after they are selected for purchase. Examples of shopping receptacles include shopping carts, baskets, or other containers that may be carried or otherwise transported by the person during the transaction. Upon completion of the transaction—for example, the person has selected all of the desired items—the person may approach one of the terminals 125 or a designated checkout area to perform a checkout transaction.

In some cases, the checkout transaction may have "touchless" aspects or may be entirely touchless. For example, visual sensors included in the environment and/or within the approached terminal 125 may acquire image information that is usable to identify the person, items within the shopping receptacle, etc. and that streamlines or otherwise facilitates the checkout transaction. As will be discussed further herein, logic may be applied to the acquired image information to determine a level of assistance to be provided during a person's checkout transaction. In some embodiments, the logic may determine a level of difficulty for completing the checkout transaction based on one or more items identified from the image information. In one example, the level of difficulty may be based on whether any of the identified items are included in one or more predetermined classes of difficult items. In another example, the level of difficulty may be based on difficulty scores corresponding to the identified items. In some embodiments, the determined level of assistance may be based on determined proficiency information for the person and/or employees. For example, the level of assistance may be determined based on the employees currently assigned to the checkout area.

It may be important to determine an appropriate balance for the type and amount of assistance to be provided to a person during a checkout transaction. For some individuals, providing additional assistance may help to streamline the checkout process, while other individuals' checkout might be slowed by the same assistance. Overall, providing the right amount and type of assistance may result in the person spending a shorter time completing their checkout transaction, which can improve their overall transaction experience. Reducing time for checkout transactions also increases the collective throughput at the checkout area. In some cases, a person may be able to complete a checkout transaction simply as part of departing the environment, without requiring the person to stop at a checkout terminal or in the checkout area. In some cases, the person's time in the checkout area may be significantly reduced, such as only a momentary pause at a checkout terminal.

Figure 2:
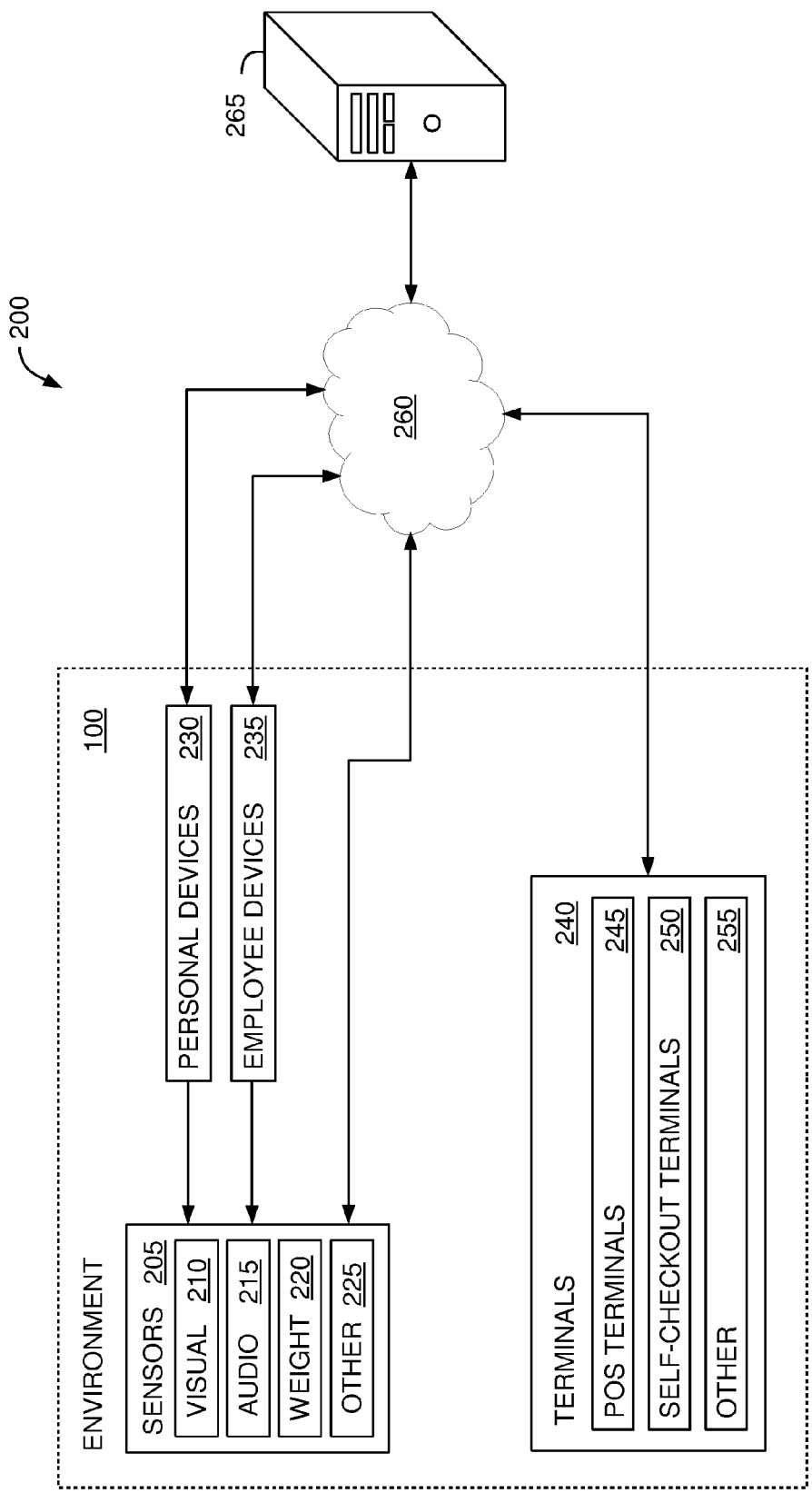
FIG. 2 illustrates an exemplary system to facilitate an audit of a checkout transaction within an environment, according to one embodiment.

FIG. 2 illustrates an exemplary system to facilitate an audit of a checkout transaction within an environment, according to one embodiment. The system 200 includes a number of components that are disposed within the environment 100. The system may also include components that are outside the environment—for example, a server 265 may be located remotely or proximately disposed to the environment (such as within a back room in the same building that is not accessible by customers).

Components within the environment include one or more sensors 205 of various types, such as visual sensors 210, audio sensors 215, and weight sensors 220. The sensors 205 may also include other sensors 225 capable of providing meaningful information about personal interactions within the environment, e.g., location sensors. The sensors 205 may be discrete sensor devices deployed throughout the environment 100 in fixed and/or movable locations. Sensors 205 may be statically included in walls, floors, ceilings, displays, or other non-sensor devices, or may be included in shopping receptacles capable of being transported through the environment. For example, weight sensors 220 may be disposed in fixed locations within the environment, such as within the floor or within a surface of a checkout terminal, and may also include load cells or other sensors disposed in a basket portion of a shopping receptacle. In one embodiment, sensors 205 may include adjustable-position sensor devices, such as motorized cameras (i.e., an example of visual sensors 210) attached to a rail, wire, or frame. In one embodiment, sensors 205 may be included on one or more unmanned vehicles configured to travel through some or all of the environment 100, such as unmanned ground vehicles (UGVs) or unmanned aerial vehicles (UAVs or "drones"). Sensors 205 may also include sensor devices that are included in computing devices associated with the environment 100, such as personal devices 230, employee devices 235, and terminals 240. In some cases, the computing devices (or the component sensor devices) may be implemented as body-worn or carried devices.

Personal devices 230 and employee devices 235 may each include passive or actively-powered devices capable of communicating with at least one of the networked devices of system 200. One example of a passive device (which may be worn or carried) is a NFC tag. Active devices may include mobile computing devices, such as smartphones or tablets, or wearable devices such as a Google Glass™ interactive eyepiece (Glass is a trademark of Google Inc.). The personal devices 230 generally denotes ownership or possession of the devices by customers within the environment 100, while the employee devices 235 denotes ownership or possession by the retailer or other administrator of the environment 100. In some cases, employee devices 235 may be carried by employees and used in the course of their employment. Personal devices 230 and employee devices 235 may execute applications or other program code that generally enables various functions and features accessible using server 265 and/or other networked computing devices. In some embodiments, sensor devices that are included with the personal devices 230 or employee devices 235 may be included in the sensors 205.

System 200 includes a plurality of terminals 240 within the environment 100. Terminals 240 generally include any structure that is capable of receiving input from and/or producing output to people (e.g., customers, employees) within the environment 100. The terminals 240 may include computing systems, portions of computing systems, or devices controllable by computing systems. In one example, a terminal 240 may include a computing device that is communicatively coupled with a visual display and audio speaker(s), as well as being communicatively coupled with one or more input devices. In another example, a terminal 240 may include a visual display and associated driver hardware, but a computing device coupled to the terminal and providing data for display is disposed separately from the terminal. In some embodiments, terminals 240 may be implemented as standalone devices, such as a kiosk disposed on the store floor or monolithic device disposed on a shelf or platform. In some embodiments, terminals 240 may be integrated partially or wholly with other components of the environment 100, such as input or output devices included with shelving or other structural components in the environment (e.g., components used for product display or storage). In some embodiments, terminals 240 may be modular and may be easily attachable and detachable to elements of the environment 100, such as the structural components.

Generally, terminals 240 may be distributed throughout the environment 100 and may enhance various phases of the person's transactions within the environment. For example, terminals 240 may include digital signage (i.e., included as an example of other terminals 255) disposed throughout the environment, such as included in or near aisles, endcaps, displays, and/or shelving in the environment. A person during a transaction may view and/or interact with the digital signage as he or she moves throughout the environment. The digital signage may be included in a static display or may be movable, such as including digital signage within a shopping receptacle. Terminals 240 may also include one or more types of terminals usable for completing checkout transactions, such as employee-manned POS terminals 245 and self-checkout terminals 250. In some cases, the terminals 240 that provide checkout functionality may be disposed within a designated checkout area within the environment 100.

In some embodiments, terminals 240 may provide an integrated functionality. For example, terminals 240 may function in a first mode as digital signage, and when engaged by a person (i.e., receiving input from the person), the terminals function in a second mode as a self-checkout terminal or other type of terminal.

Server 265 generally includes processor(s), memory, and communications capabilities and may perform various computing tasks to support the operation of the environment 100. Server 265 may communicate using various wired and/or wireless communications methods with terminals 240, sensors 205, and with other networked devices such as personal devices 230 and employee devices 235. Server 265 generally executes computer program code in which input data is received from networked devices, the input data is processed and/or stored by the servers, and output data is provided to networked devices for operation of the environment 100.

Network 260 may include one or more networks of various types, including a local area or local access network (LAN), a general wide area network (WAN), and/or a public network (e.g., the Internet). In one embodiment, various networked computing devices of the system 200 are interconnected using a LAN, and one or more computing devices (e.g., server 265, personal devices 230) include connections to the Internet.

Figure 3:
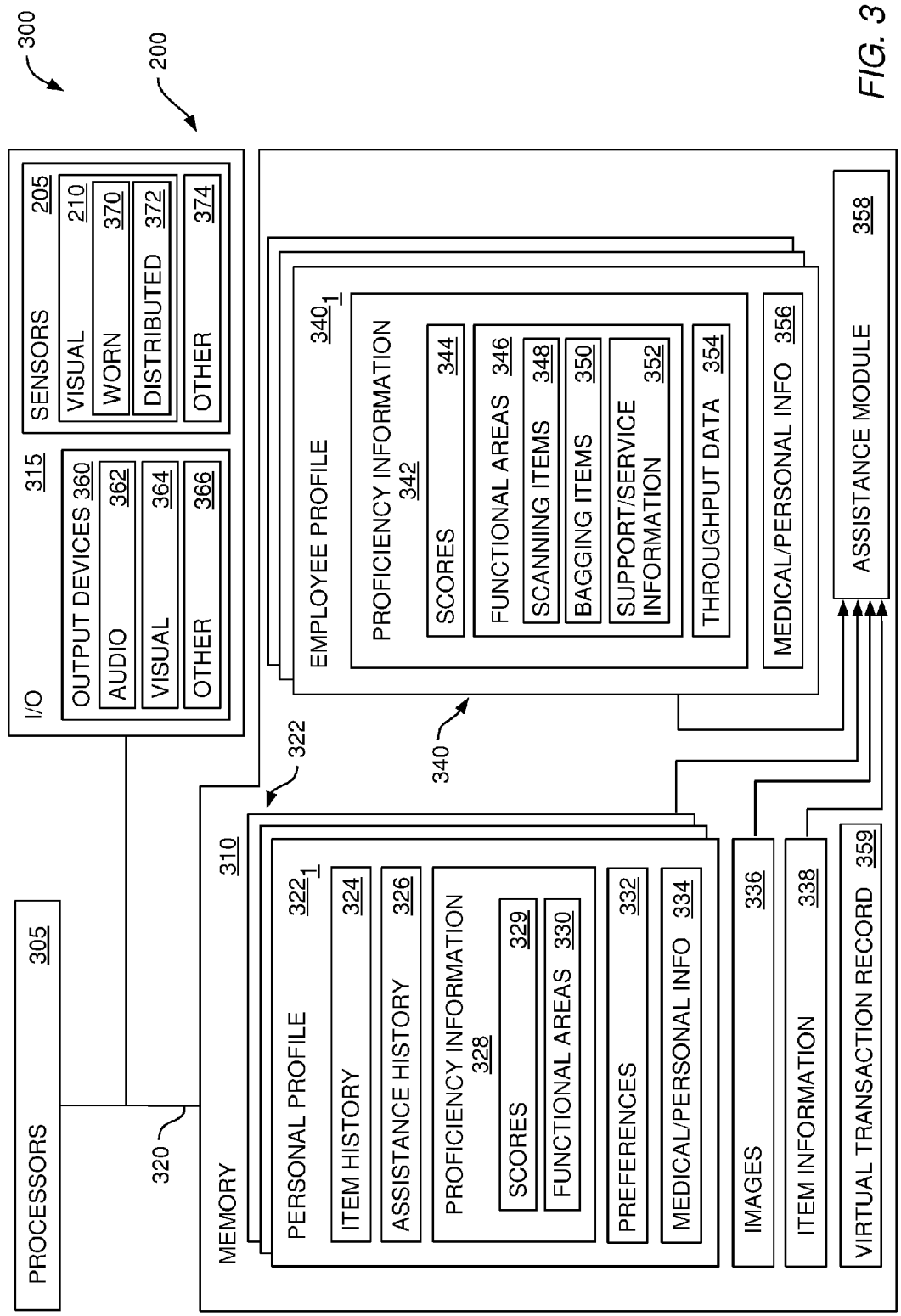
FIG. 3 is a block diagram illustrating operation of a system to facilitate a checkout transaction based on a determined level of difficulty for completing the checkout transaction, according to one embodiment.

FIG. 3 is a block diagram illustrating operation of a system to facilitate a checkout transaction based on a determined level of difficulty for completing the checkout transaction, according to one embodiment. Specifically, the arrangement 300 illustrates operation of the system 200. Arrangement 300 includes a number of processors 305, memory 310, and input/output 315, which are interconnected using one or more connections 320. In one embodiment, the arrangement 300 may be implemented as a singular computing device and connection 320 may represent a common bus. In other embodiments, arrangement 300 is distributed and includes a plurality of discrete computing devices that are connected through wired or wireless networking. The processors 305 may include any processing element suitable for performing functions described herein, and may include single or multiple core processors, as well as combinations thereof. Processors 305 may be included in a single computing device, or may represent an aggregation of processing elements included across a number of networked devices such as personal devices 230, terminals 240, etc.

Input/output (I/O) 315 includes one or more output devices 360 and one or more sensors 205. Output devices 360 include one or more devices for presenting information to customers and generally include audio output devices 362 and/or visual output devices 364. The audio output devices 362 may include conventional audio speakers having any suitable form factor (e.g., standalone, integrated in a stereo, headphones, etc.), as well as devices using alternative methods of producing sound perceptible by a person such as a customer or employee, such as bone conduction transducers in a worn device. Visual output devices 364 may include visual displays and various visual indicators such as light emitting diodes (LEDs). In some embodiments, the terminals 240, personal devices 230, and employee devices 235 of FIG. 2 may include output devices 360, such as visual devices 364 (e.g., visual displays, indicators) and/or audio devices 362 (e.g., speakers) for communicating with persons during their transactions. Other output devices 366 may provide information to customers through tactile feedback (e.g., haptic devices) or using other sensory stimuli. Sensors 205 may include visual sensors 210 which may be carried or worn sensors 370, and distributed sensors 372 that are disposed throughout the environment. In one embodiment, the distributed sensors 372 are disposed in a static arrangement in the environment. In one embodiment, at least some of the distributed sensors 372 are movable. For example, the distributed sensors 372 may be included on movable product displays or structures, and/or unmanned vehicles (e.g., aerial or ground-based vehicles). Other sensors 374 may also be included that are suitable for collecting information about a person and his/her interactions within the environment. Examples of other sensors 374 include without limitation infrared (IR) sensors, thermal sensors, weight sensors, capacitive sensors, magnetic sensors, sonar sensors, radar sensors, lidar sensors, and so forth. Generally, other sensors 374 include the audio sensors 215, weight sensors 220, and/or other sensors 225 that are depicted in FIG. 2.

I/O 315 may also include input devices (not shown) suitable for receiving input from persons, such as cameras, keyboards or keypads, touchscreens, buttons, inertial sensors, etc. I/O 315 may further include wired or wireless connections to an external network (e.g., network 260) using I/O adapter circuitry.

The visual sensors 210 may be used to capture one or more images 336 (also referred to as "image information") of the person and/or the environment, which may include views from various perspectives (e.g., a customer-worn visual sensor, static or movable visual sensors at various locations in the environment). The images 336 may be stored in memory 310, and may be individually or collectively processed by processors 305 to determine information about persons within the environment and their respective interactions with items in the environment.

Memory 310 may include a variety of computer-readable media selected for their size, relative performance, or other capabilities: volatile and/or non-volatile media, removable and/or non-removable media, etc. Memory 310 may include cache, random access memory (RAM), storage, etc. Storage included as part of memory 310 may typically provide a non-volatile memory for the networked computing devices (e.g., server 265), and may include one or more different storage elements such as Flash memory, a hard disk drive, a solid state drive, an optical storage device, and/or a magnetic storage device. Memory 310 may be included in a single computing device or may represent an aggregation of memory included in networked devices. Memory 310 may include a plurality of modules for performing various functions described herein. The modules generally include program code that is executable by one or more of the processors 305. As shown, modules include an assistance module 358 and may also include item and/or person identification modules (not shown) configured to analyze the images 336 and/or item information 338. The modules may also interact to perform certain functions. For example, assistance module 358 makes calls to an item identification module and/or person identification module to determine item difficulty scores and/or personal proficiencies for a checkout transaction. The person of ordinary skill will recognize that the modules provided here are merely non-exclusive examples; different functions and/or groupings of functions may be included as desired to suitably operate the environment.

Memory 310 includes a plurality of personal profiles 322 corresponding to the different persons. The personal profiles 322 may be associated with a loyalty program administered in the environment. During operation of the system 200, the personal profiles 322 may be associated with a current transaction for a person after identifying the person using the person's portable computing device (e.g., a login using a phone app), a visual scan of the person's loyalty card or the person's face or other identifying features, etc. In one embodiment, the personal profiles 322 and image information 336 may be stored on the server 265 or on a separate database.

Personal profiles 322 include an item history 324 reflecting previous item interactions for the person, which may have occurred earlier in time during the current transaction and/or during previous transactions. The item history 324 may include a purchase history, item handling history and associated behaviors, determined interest levels for items, etc. Personal profiles 322 include an assistance history 326 reflecting previous help interactions for the person, which may have occurred earlier in time during the current transaction and/or during previous transactions. Assistance history 326 may include information about the person's interactions with employees at various locations within the environment, such as on the store floor, at checkout, etc. Assistance history 326 may include information about the person's interactions with computer-based assistance, such as might be interactively provided through a self-checkout terminal or using computing devices during the transactions.

Personal profiles 322 include proficiency information 328 for the person. To provide an accurate assessment of how much assistance the person requires for a given transaction, such as during a checkout transaction, the person may be rated using one or more scores 329 which may correspond to one or more functional areas 330. The scores 329 may represent numerical values, tiers, etc. and are generally based on the person's item history 324 and/or assistance history 326. The scores may be independent assessment values or may reflect compiled statistics for the person, e.g., average time required to complete a checkout transaction, average number of mistakes, etc. The functional areas 330 generally relate to various functions that may be typically performed in the environment, such as locating items, handling items, scanning items at a self-checkout terminal, bagging items, presenting payment, proficiency with the user interface of the self-checkout terminal, etc. In one embodiment, each of the scores corresponds with one of the functional areas. In one embodiment, the scores correspond to various predetermined classes of "difficult" items. Generally, certain items within the environment may be designated or classified as difficult due to a difficulty in handling and/or processing during a transaction. Classes of difficult items are discussed below with respect to FIG. 4, but some examples include large or bulky items, loose items such as produce that is weighed or requires entry of a product code, items that require additional interactions with the person, such as a verification of the person's age or offering a warranty/service plan for the items, etc.

Personal profiles 322 also include personal preferences 332 reflecting preferences that are explicitly specified by the person, or that may be deduced by the system based on the person's item history 324, assistance history 326, etc. The person may specify preferences using a personal computing device (e.g., through a store app) or through terminals or other computing devices accessible in the environment. In one example, a person may prefer to speak with a store associate instead of navigating through an interactive help menu on a self-checkout terminal. Thus, when determining an amount of assistance to provide to the person, the system 200 may assign additional personnel to the area so that adequate human assistance is accessible for the person during a checkout transaction. In another example, a person prefers to not handle large or bulky items, which could be deduced based on the person's historical help requests for large items included in assistance history 326. In another example, a person prefers to receive instructions or assistance in a different language.

Personal profiles 322 may also include medical or personal information 334. For example, a person could specify that they have certain physical disabilities or limitations, such as requiring a cane to walk, having a bad back, etc. that may affect their ability to perform certain item transactions within the environment. In some embodiments, physical conditions may be correlated with certain classes of difficult items to determine an appropriate type and/or amount of assistance for the person. For example, a bad back may be linked to bulky items, so that the system may assign an employee who is able to lift a bulky item for the person during a particular transaction. In another example, the medical or personal information 334 may reflect self-identification demographic information. For example, the person may self-identify as a mother having a number of young children in the household. Accordingly, the system may determine that the person may require relatively more assistance during a transaction, e.g., assuming the person would bring the children along and/or identifying children included with the person in images 336 from previous transactions, etc.

Memory 310 also includes a plurality of employee profiles 340 corresponding to the different employees within the environment. Similar to the structure of personal profiles 322, employee profiles 340 may include various elements of proficiency information 342 for the employee. The proficiency information 342 may include scores 344 and functional areas 346. In one embodiment, scores 344 correspond to the predetermined classes of difficult items. In one embodiment, scores 344 correspond to the functional areas 346. As the role of the employee within the environment differs from that of a customer, the functional areas 346 may differ from the functional areas 330. In one embodiment, at least one functional area is shared between functional areas 346 and 330. For example, the employee may be evaluated according to his or her ability to scan items 348, bag items 350, which may be skills that are shared with customers. The employee may also be evaluated according to his or her ability to provide support or service information 352 related to an item to a customer, which is a task generally not performed by a customer.

Proficiency information 342 may include throughput data 354 that indicates the employee's relative performance during checkout transactions. For example, the throughput data 354 may be specified as throughput rates (e.g., how long does it take for the employee on average to complete a checkout transaction?), error rates (e.g., how many errors in an average checkout transaction?), and so forth.

Employee profiles 340 include medical or personal information 356 for the employee, and may include elements similar to the medical or personal information 334 discussed above. The medical or personal information 356 may include basic employment information for the employee, such as gender, age, foreign language proficiency, length of time as an employee, etc. that may be used to assess the types and amount of assistance that the person is capable of providing. For example, a brand new employee would not likely have an extensive knowledge of item locations, store procedures, etc.

The foreign language proficiency information may be used to assign an employee who speaks a customer's preferred language to assist the customer. The medical or personal information 356 may further include information related to the current work session or shift, such as how long the employee has been working. The current work session information may be analyzed to identify any trends that affect the employee's performance or ability to provide assistance. For example, the employee's throughput rates tend to decrease after a certain amount of shift time but increase following a meal break. The person of ordinary skill will recognize that many other correlations with employee performance and assistance are possible, such as the proximity of a supervisory employee.

The personal profiles 322 and employee profiles 340 may be inputs to the assistance module 358 to determine the appropriate level of assistance for transactions, as well as how best to distribute employees to provide the assistance. The assistance module 358 may also receive images 336, item information 338, as well as other information to make the determination. The assistance determination may be associated with a virtual transaction record 359, which generally includes data associated with a particular person and items selected by the person for a checkout transaction. The virtual transaction record 359 may be adaptively updated as the person interacts with items during a transaction (e.g., adds or removes items from a shopping receptacle) within the environment, and the assistance determination in some cases may be updated with the various interactions. Additional examples of the assistance determination are provided below with respect to FIGS. 8 and 9.

Figure 4:
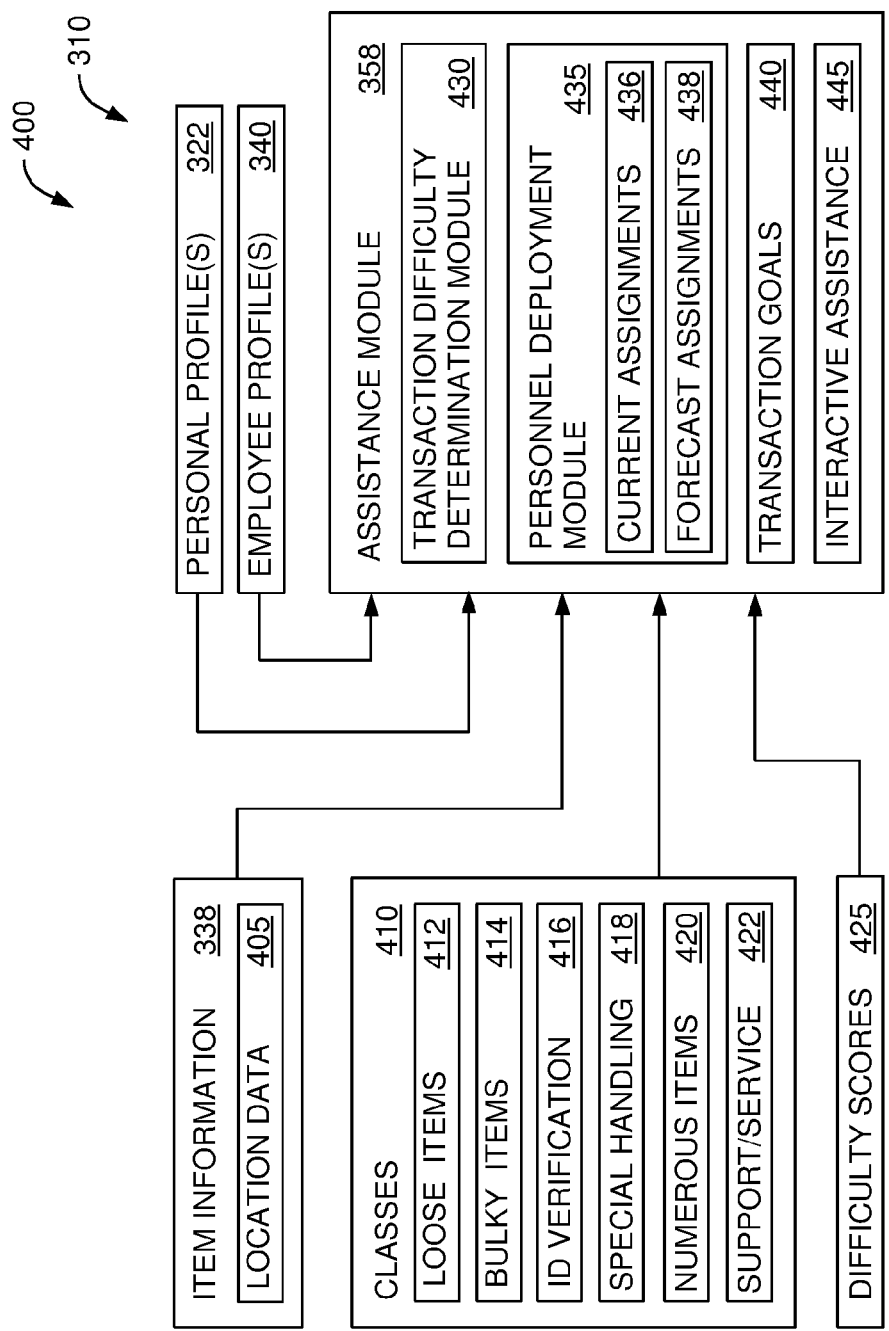
FIG. 4 is a block diagram illustrating operation of an exemplary assistance module, according to one embodiment.

FIG. 4 is a block diagram illustrating operation of an exemplary assistance module, according to one embodiment. The arrangement 400 may be used in coordination with the various systems and environments described herein. Generally, elements of the arrangement 400 may be included partially or entirely within memory 310.

Arrangement 400 includes item information 338 for items included within the environment and generally available for selection by a person. Item information 338 may include information describing any number of aspects of the items: physical properties of the items, pricing, current inventory levels, location data 405 indicating item location(s) within the environment (e.g., a planogram), and so forth. In some cases, the location data 405 may be used with images to determine which items have been selected by a person. For example, an overhead visual sensor disposed over an aisle having large bags of dog food may correlate certain locations of the aisle with a "bulky item" classification, such that when a person selects an item at or sufficiently close to the location, the item is classified as bulky without the need for a full identification of the item using image analysis. This may reduce a computational burden on the system.

Items in the environment that are determined to be "difficult" due to a difficulty in handling and/or processing during a transaction are included in one or more of a predetermined number of classes 410. Classes 410 include loose items 412, such as fresh produce or bulk foods that typically require the items to be weighed, a quantity of the items to be entered, and/or corresponding product codes to be entered at checkout. Classes 410 include bulky items 414 that may be difficult to manipulate due to item size, shape, and/or weight, and include ID verification items 416 for age-restricted or other restricted items (such as alcohol, tobacco, movies and music, medicines, weapons, high-value items, etc.). Classes 410 include special handling items 418. In one example, a person may present a voucher to purchase a video game that is located within a locked display case. In another example, the person may select items that include or are attached to theft-prevention devices (such as electromagnetic tags), which an employee must deactivate when the person purchases the item. Classes 410 also include numerous items 420 that, although not individually problematic for a person to handle, are typically purchased in sufficient quantities that handling of the items becomes difficult. For example, items packaged in small jars, cans, or other containers that are sold separately (i.e., not grouped together in packaging) may be difficult for the person to handle during a checkout transaction. Some non-limiting examples include jars of baby food, cups of yogurt, soup cans, and so forth. Classes 410 also include items that are associated with support or service information 422 such as an item warranty, an item service plan, an item replacement or upgrade plan, and so forth. Typically, the support or service information is presented to a customer during the checkout transaction, whether by a computer-based message or by an employee. Some non-limiting examples of items associated with support or service information 422 include consumer electronics (such as media players, cell phones, computers, etc.) and consumer appliances (such as coffee makers, food processors, vacuum cleaners, etc.).

Each item in the environment may be associated with a difficulty score 425. In some embodiments, the difficulty score 425 may be calculated based on whether the item is included in one or more "difficult" classes 410. For example, an expensive bottle of alcohol may be included in two classes—ID verification class 416 and special handling class 418. Accordingly, the bottle may have a larger difficulty score than a computer hard drive that is included in only one class—special handling class 418. The difficulty scores 425 for individual items may be used to calculate a difficulty score for an entire transaction of the person (e.g., a cart full of different items).

The item difficulty scores 425 may be adaptively updated, based on customer interactions. For example, if a number of transactions indicate that the person requested assistance with a particular item, the system may update the difficulty score for the item.

As shown, assistance module 358 includes a number of functional sub-modules. A transaction difficulty determination module 430 operates to determine a difficulty level for a particular transaction based on classes 410 and/or difficulty scores 425. In one embodiment, the difficulty level for a transaction is based on a combination of the difficulty scores 425 for the various items included in the transaction. For example, the transaction difficulty level may reflect a simple sum of the item difficulty scores, a weighted sum, and so forth. In another embodiment, the transaction difficulty level is based on one or more largest item difficulty scores 425. For example, a first transaction of 12 items each having a difficulty score 1 (i.e., a sum of 1*12=12) may be assigned a lesser transaction difficulty level than a second transaction having 1 item of difficulty score 3 (indicating a greater difficulty), even though the sum of the first transaction exceeds the sum of the second transaction.

The transaction difficulty level may be represented as a determined one of a plurality of discrete levels. In one embodiment, the discrete levels are binary—that is, a transaction is determined to be either "difficult" or "not difficult." For example, a transaction may be determined difficult when it includes any item from a predetermined class 410 of "difficult" items. Of course, the transaction difficulty level may provide a greater resolution of difficulty, which may be based on composites of the item difficulty scores 425. For example, the plurality of levels may use qualitative descriptors such as "high," "medium," "low," and "no" difficulty. The plurality of levels may also use quantitative values to distinguish the different levels of difficulty.

Based on the determined transaction difficulty level, the assistance module 358 uses a personnel deployment module 435 to make changes to distributions (or assignments) of employees within the environment. The changes to the distributions generally make additional assistance available for completing difficult transactions. In one embodiment, the distribution changes are made reactively. For example, when a person associated with a difficult transaction arrives at a POS station, the assistance module 358 updates the current assignments 436 of employees to provide additional assistance at the POS station. In another embodiment, the assignment changes may also be made proactively. For example, a person selects a bulky item and places it into his or her shopping cart. The assistance module 358 may generate forecast assignments 438 to prospectively make assistance available, for example, at the estimated time of the person's checkout transaction. Estimating times for transactions may be based on, for example, the person's item and/or purchase history, a shopping list entered through a store app, the person's path through the environment, and so forth.

The personnel deployment module 435 may also analyze one or more transaction goals 440 to generate the updated assignments (i.e., updates to current assignments 436 and/or forecast assignments 438). The transaction goals 440 may specify certain performance milestones or criteria, such as throughput rates, error rates, etc. The transaction goals 440 may be adaptively updated and adaptively applied based on current and predicted transactions within the environment. For example, a first set of transaction goals applied for checkout transactions at a first time may include an average checkout transaction time of 5 minutes with an average error rate of 2 errors or less per checkout transaction. The first set may be based, e.g., on the current number of checkout transactions. If, at a second time (or at a predicted second time), a significantly larger number of contemporaneous checkout transactions occur, a second set of transaction goals may be applied to streamline checkout transactions. Doing so may improve customer satisfaction (i.e., less waiting and hassle at checkout), improve mobility through the environment (i.e., no long lines), and so forth. For example, the second set of transactions may reduce the average checkout transaction time (e.g., 3 minutes instead of 5) and not apply an average error rate goal. Based on the updated transaction goals, the personnel deployment module 435 may assign additional employees to the checkout area. In some cases, the personnel deployment module 435 may preferentially select, based on information included in employee profiles 340, more experienced and/or better performing employees to ensure the updated goals are met. Of course, other transaction goals and application schemes are possible. An example of updating employee assignments is provided below with respect to FIG. 8.

In other embodiments, interactive assistance 445 provided to a person may be adapted based on the determined transaction difficulty level. For example, interactive assistance 445 may be provided to the person through a display at a self-checkout terminal, through communication with the person's mobile computing device, etc. In one embodiment, the amount of interactive assistance 445 is changed based on the transaction difficulty level. For example, when the assistance module 358 determines a "difficult" transaction occurring with a relatively inexperienced or not proficient customer (e.g., determined based on data in personal profile 322), a greater amount of interactive assistance 445 may be provided by the assistance module 358. In some cases, the interactive assistance may include sending prompts or suggestions to the person regarding the transaction. Increasing the amount of interactive assistance may include sending a greater number of prompts or suggestions, setting a lower threshold for intervening in a transaction with a prompt, and so forth. While providing a greater amount of interactive assistance to an experienced or proficient person could seem annoying or intrusive without providing any corresponding benefit, the greater interactive assistance may be particularly useful for less experienced persons in order to meet transaction goals. The assistance module 358 may determine a preferred amount of interactive assistance in an attempt to balance the intrusive nature of such assistance with a measure of the "helpfulness" of the assistance for the person based on the person's behavioral feedback responsive to the assistance (e.g., Did the person acknowledge or ignore the prompt? Did the person request human employee assistance despite the suggestions? Did the person explicitly indicate that the suggestion did not address the problem/was not helpful? etc.).

FIGS. 5 and 6 illustrate exemplary selections of items to be presented during a checkout transaction, according to one or more embodiments. Aspects of scenes 500, 530, 560, and 600 may be captured using one or more visual sensors disposed within the environment.

Scene 500 illustrates a shelving unit 505 having multiple shelves 510A, 510B with items 515A-D displayed thereon. As shown, a person 502 removes the item 515A off of the shelf 510A at a first time (Time 1). Scene 530 illustrates the person 502 walking away from the shelving unit 505—indicated by movement arrow 535—at a second time Time 2A following Time 1. The person 502 walks away while holding the removed item 515A. The act of walking away with the item 515A in the person's possession is a strong indication that the person has selected the item for later presentation during a checkout transaction. In some embodiments, determining that the person has selected the item adds the item to a listing of items in a virtual transaction record 359 associated with the person. The virtual transaction record 359 is maintained by the system until the transaction is completed—typically, when items are paid for during a checkout transaction.

Scene 560 illustrates the person 502 at an alternative second time Time 2B following Time 1. The person 502 places the removed item 515A—indicated by movement arrow 570—into a shopping receptacle (i.e., shopping cart 565). Other examples of a shopping receptacle include shopping baskets, bags, or other suitable containers. The act of placing the item into the shopping receptacle is another strong indication that the person has selected the item for later presentation during a checkout transaction. In some embodiments, determining that the person has selected the item adds the item to the listing of items in the virtual transaction record 359.

Scene 600 of FIG. 6 illustrates the person 502 walking through the environment, as indicated by the movement arrow 610. As shown, the person 502 is pushing shopping cart 565 containing items $615_{1-M}$ within the basket of the shopping cart, and an item $615_N$ under the basket. Scene 600 may reflect that the person 502 has completed selection of items for the current transaction (e.g., the current shopping trip) and seeks a checkout terminal within the environment to complete the transaction (e.g., payment for the selected items). As the person walks along the floor 605, a visual sensor 620 may capture image information about the contents of the shopping cart 565. In one embodiment, the visual sensor 620 may be disposed overhead, e.g., mounted in the ceiling. In another embodiment, visual sensor 620 disposed in an alternate location within environment, whether fixed or movable (e.g., disposed in other structures, disposed on the shopping cart 565, a drone, worn by the person, etc.). In another embodiment, more than one visual sensor 620 is used to capture image information about the contents of the shopping cart. In one embodiment, the visual sensor 620 captures image information at a predetermined location relative to a checkout terminal or area. The predetermined location may correspond to a particular area or areas 625 on the floor 605, and the store or environment administrator may select the location of the area 625 such that all (or a large majority of) shoppers typically pass through the area prior to approaching a checkout terminal. In some cases, the area 625 may be selected corresponding to a portion of the floor with a narrowing effect. Some non-limiting examples include areas where floor displays narrow the passable areas of the floor, and a winding queue area prior to approaching checkout terminals.

The area(s) 625 may be selected to correspond to a predetermined distance from the checkout area—as shown by direction arrow 630 ("To checkout terminals"). The distance may be especially useful for environments that include a single, contiguous checkout area (e.g., a spatial grouping of several checkout terminals). The predetermined distance may be selected to provide an amount of lead time for generating the updated employee assignments, and for employees responding to the updated employee assignments.

The image information captured by visual sensor 620 at area(s) 625 may be used to identify one or more items that the person will present at the checkout transaction. As described above, item identification may be used to determine a difficulty level of the transaction, as well as whether additional assistance is needed for the person based on the staffing at the checkout area and/or predetermined transaction goals. In some embodiments, all of these functions may be performed responsive to the person crossing the area 625. In other embodiments, some of the functions may be performed prior to crossing the area 625. For example, the transaction difficulty level and assistance requirement may be determined and/or adaptively updated during the person's transaction in the environment. The transaction difficulty level and assistance requirement may be based on items logged in the person's virtual cart, which in turn may be based on visually identifying items at the time of their selection or while the person navigates through the environment. Capturing image information at area 625 may identify one or more items that were logged in the person's virtual cart, thus visually confirming the particular transaction.

Figure 7:
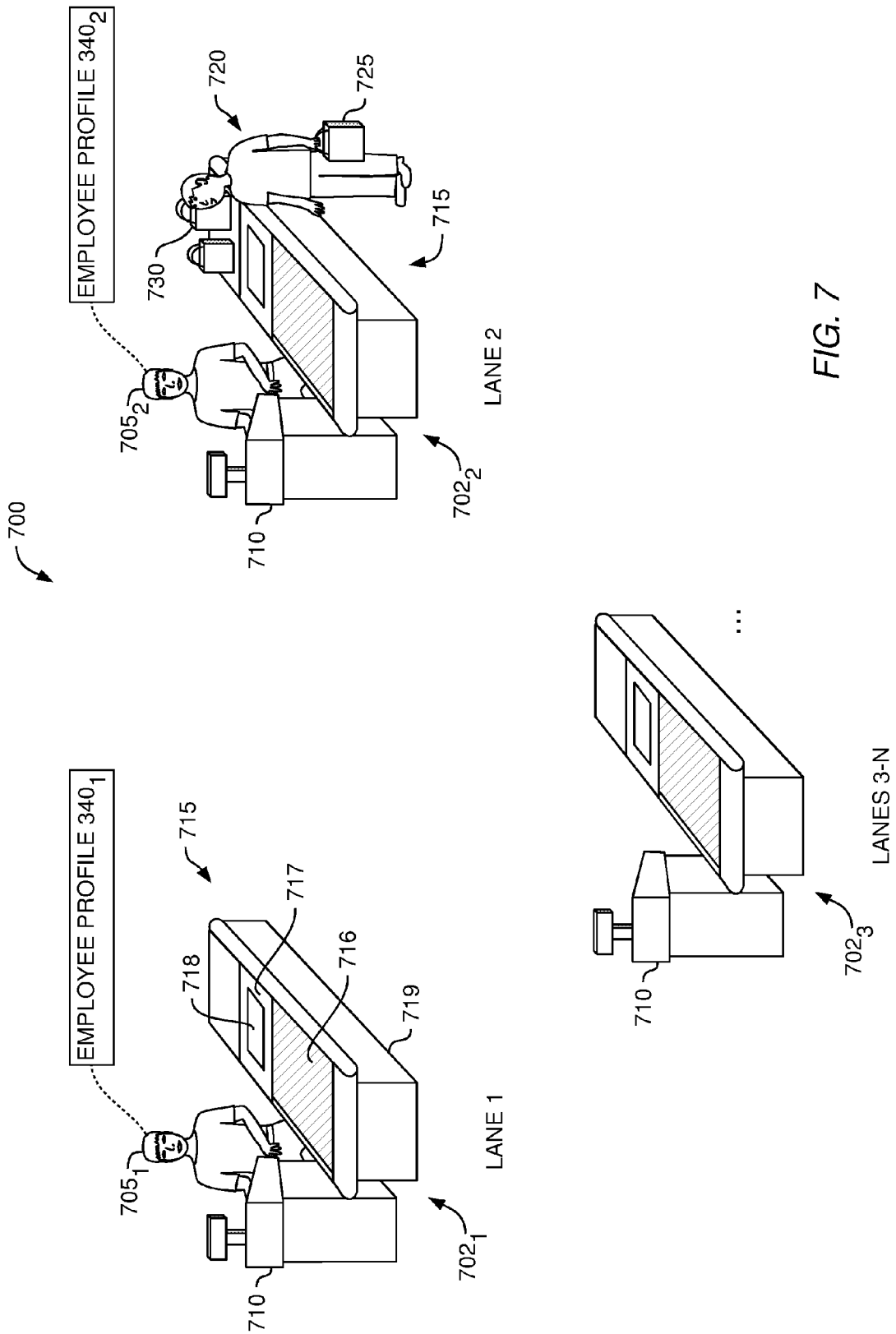
FIG. 7 illustrates an exemplary arrangement of checkout terminals within an integrated shopping environment, according to one embodiment.

FIG. 7 illustrates an exemplary arrangement of belted lane checkout terminals within an integrated shopping environment, according to one embodiment. Alternative implementations, such as bagger lane checkout terminals, are also possible. Scene 700 illustrates a checkout area having several checkout lanes (Lanes 1-N) available for the person to checkout. Each lane includes a checkout counter 702 including a POS terminal 710 and an item conveyor assembly 715. The item conveyor assembly 715 may include a conveyor belt portion 716 to displace items towards the weighing portion 717, which may define a windowed portion 718 for scanning encoded information or performing other visual sensing. A platform portion 719 is provided for bagging items once weighed and/or scanned.

As shown, Lane 1 is staffed by a first employee $705_1$ corresponding to an employee profile $340_1$, Lane 2 is staffed by a second employee $705_2$ corresponding to employee profile $340_2$, and Lane 3 is unmanned. Lane 2 has a customer 720 holding a shopping basket 725 during a checkout transaction in progress. Several items have been bagged in bags 730.

While checkout terminals requiring employee staffing are shown, self-checkout terminals or kiosks may be additionally or alternatively included in a checkout area.

Figure 8:
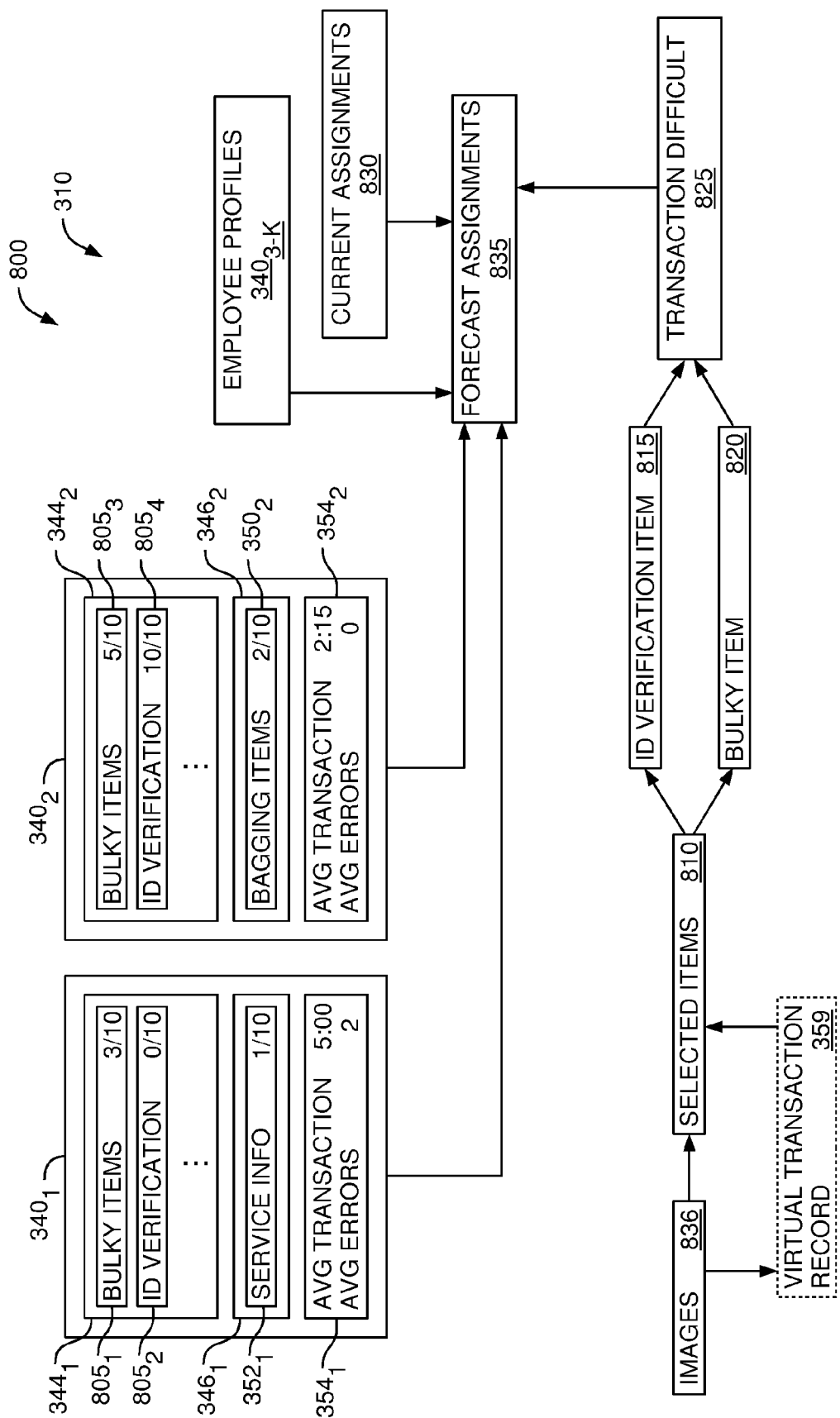
FIG. 8 is a block diagram illustrating exemplary operation of the integrated shopping environment to produce forecast assignments, according to one embodiment.

FIG. 8 is a block diagram illustrating exemplary operation of the integrated shopping environment to produce forecast assignments, according to one embodiment. The arrangement 800 reflects the interaction of various elements of memory 310 within one possible implementation of the environment, such as the checkout area depicted in scene 700.

Each employee profile 340 includes proficiency scores 344, ratings for functional areas 346, and throughput data 354. As shown, the employee profiles $340_{1,2}$ may correspond to the employees $705_{1,2}$ depicted in scene 700. Employee profiles $340_{3-K}$ correspond to other employees, who are not staffing the checkout area. Employee profile $340_1$ includes a first score $805_1$ for bulky items (3/10) and a second score $805_2$ for ID verification items (0/10), a first rating $352_1$ for providing service information (1/10), and throughput data $354_1$ indicating an average checkout transaction time of 5:00 minutes, and an average error rate of 2 per transaction. The low scores and rating may generally indicate that employee $705_1$ is relatively inexperienced. Employee $705_1$ may have a zero score for score $805_2$ for any number of reasons: too young to perform ID verification tasks, too inexperienced, untrustworthy, and so forth.

Employee profile $340_2$ includes a first score $805_3$ for bulky items (5/10) and a second score $805_4$ for ID verification items (10/10), and throughput data $354_2$ indicating an average checkout transaction time of 2:15 minutes, and an average error rate of 0 per transaction. Generally, the relatively higher scores and throughput data may indicate that the employee $705_2$ is relatively more experienced or proficient than employee $705_1$. However, employee profile $340_2$ also includes a rating $350_2$ indicating that employee $705_2$ is not very proficient at bagging items (2/10).

During a shopping transaction for a person (here, a customer), a number of images 336 are captured at block 836 using visual sensors within the environment. The images 336 may be processed to determine selected items at block 810, which may optionally be included in a virtual transaction record 359. In this example, the selected items determined at block 810 include at least one ID verification item determined at block 815 and one bulky item determined at block 820. Based on the selected items, the overall transaction is deemed to be difficult at block 825. The transaction difficulty level determination in block 825, employee profiles $340_1$, $340_2$, current assignments 830, and employee profiles $340_{3-K}$ may be used to generate forecast assignments at block 835 to best staff the checkout area and other areas of the environment. Alternatively, these factors may be used to update the current assignments at block 830.

FIG. 9 illustrates exemplary assignment distributions, according to one embodiment. The view 900 generally corresponds an overhead view of the checkout area depicted in scene 700 and the arrangement 800 discussed above. The approach to Lanes 1-N includes a respective area $625_{1-N}$ for capturing image information, which may be used to determine and/or update assignment distributions.

Two different assignment distributions are provided for view 900. In a first assignment distribution (Assignment Distribution 1, corresponding to scene 700), a number of possible assignment positions 901, 902, 903 correspond to each lane or checkout counter 702. For example, position $902_1$ could correspond to a primary checkout assignment at Lane 1, position $901_1$ to a secondary or assistant checkout assignment, and $903_1$ to a bagging assignment. Of course, this is a graphical representation of one possible assignment distribution, and numerous other assignments and distributions are possible (alternative positions or areas of responsibility, dynamic or roving assignments, and so forth). Employee $705_1$ is currently assigned to the primary checkout assignment at position $902_1$, and employee $705_2$ is assigned to the primary checkout assignment at position $902_2$. The other positions $901_{1,2,3,n}$, $902_{3,n}$, and $903_{1,2,3,n}$ do not have an employee assigned.

In the second assignment distribution (Assignment Distribution 2), the assignments are updated based on, e.g., current or anticipated difficult transactions, transaction goals, employee and customer proficiency levels, etc. as described above. For example, the updates may be applied immediately in response to an increase in customer transactions, difficult transactions etc. or may be prospectively determined based on estimated transaction times.

At Lane 1, another employee $705_3$ is assigned to the position $901_1$ (assistant checkout). For example, this assignment may reflect a detected checkout transaction having an ID verification item (which employee $705_1$ is not rated to complete according to score $805_2$), an item associated with service information (for which employee $705_1$ has a low rating $352_1$), and/or a need to increase the throughput at Lane 1 (i.e., improve from the throughput data $354_1$). The employee $705_3$ may be selected particularly for their abilities in deficient areas of the employee $705_1$, as reflected in corresponding employee profile $340_3$. For example, employee $705_3$ may be qualified to perform ID verification, have a higher service information rating, and so forth.

In some embodiments, the capabilities of the employees are collectively considered so that employees are assigned judiciously throughout the environment. For example, the employee having the single highest rating for providing service information does not need to be assigned each time another employee is deficient in providing service information. This may lead to certain proficient employees doing a disproportionate share of the work—which may hinder employee development, disincentivize proficiency, and cause employee dissatisfaction. Instead, and in view of the various transaction goals, it may be sufficient that the newly-assigned employee has the relevant score/rating/throughput data that is greater than that of the currently assigned employee. In some cases, this may also be based on threshold values; for example, a threshold value of 5/10 may determine whether an employee is at least marginally qualified to perform a task. Thus, an employee rated 5/10 for a particular task may be assigned to assist a current employee in the task, while an employee rated 4/10 is not assigned even if the rating exceeds that of the current employee.

At Lane 2, another employee $705_4$ is assigned to the position $903_2$ (bagging items) based on the employee profile $340_4$. For example, the employee $705_4$ may have a better rating for bagging items than the employee $705_2$. At Lane 3, an employee $705_5$ is assigned to position $902_3$ to open Lane 3 for customer checkouts and increase overall throughput.

Figure 10:
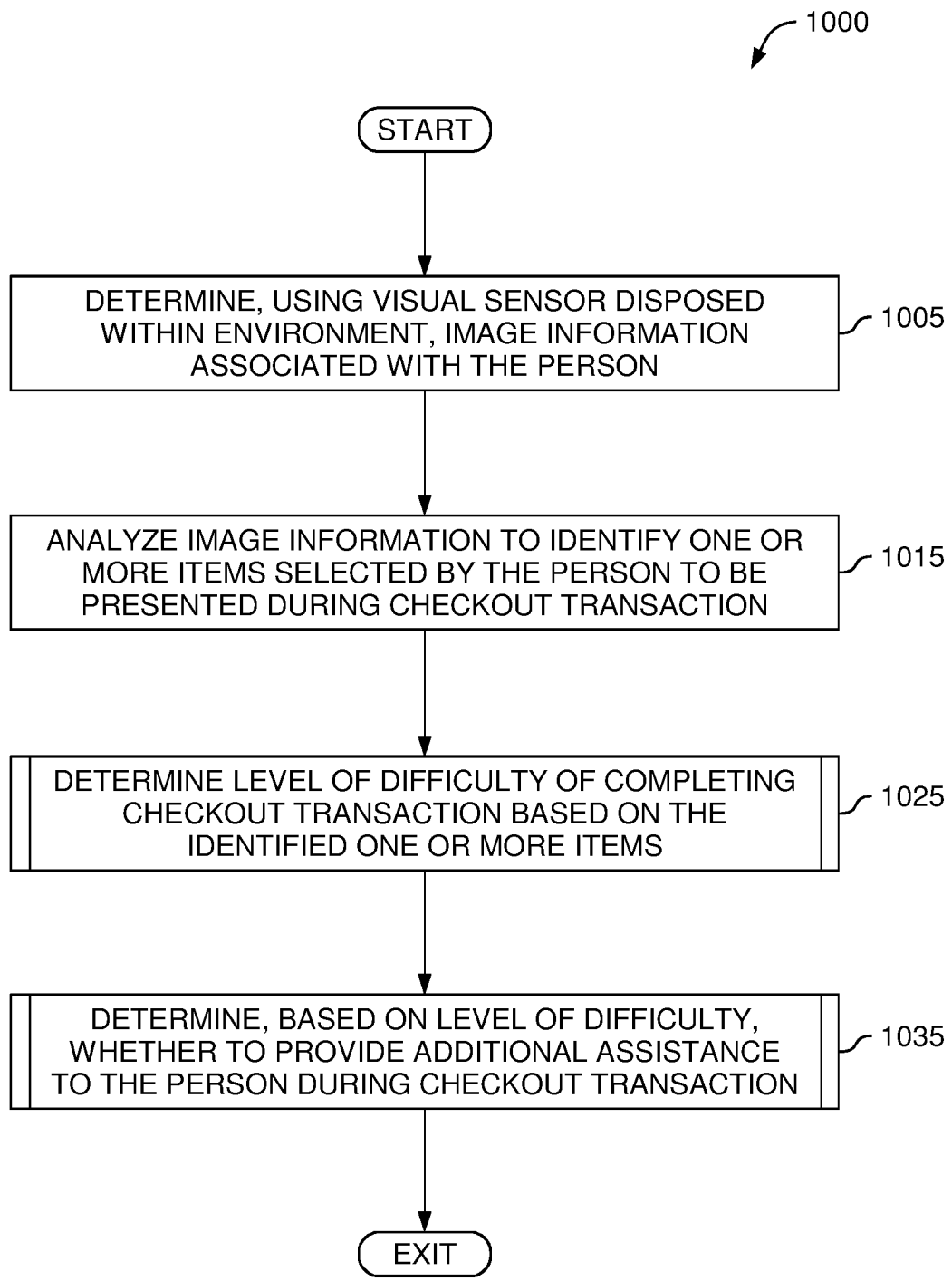
FIG. 10 illustrates a method of facilitating a checkout transaction based on a determined level of difficulty for completing the checkout transaction, according to one embodiment.

FIG. 10 illustrates a method of facilitating a checkout transaction based on a determined level of difficulty for completing the checkout transaction, according to one embodiment. The method 1000 may be used in coordination with the systems and environments described herein.

Method 1000 begins at block 1005, where image information associated with the person is determined using a visual sensor disposed within the environment. In some embodiments, determining the image information includes capturing images that include the person and/or a shopping receptacle associated with the person, etc. In one embodiment, the image information may be acquired at the time of selection of the items, or during a shopping or other transaction within the environment. In another embodiment, the image information may be acquired at a time just prior to a checkout transaction, such as corresponding to a spatial area near the checkout area of the environment.

At block 1015, the acquired image information is analyzed to identify one or more items that are selected by the person to be presented during a checkout transaction. The analysis may include determining certain actions by the person relative to the item and/or based on the location of the image information. For example, image information collected at a predetermined location near the checkout area may indicate that the person is going to present the items at checkout. In another example, the image information may be acquired near the place of item selection, such as near shelving or displays. Determining actions such as placing the item in a shopping receptacle or walking away from the shelf while holding the item may also indicate that the items have been selected for the checkout transaction.

In some cases, a complete visual identification of the one or more items is not required. A "coarse" analysis of the image information may be used to estimate features such as an item's size, a shape of the item, a predominant color of the item (e.g., a mostly blue container), placement within the shopping receptacle, etc., without performing a more refined image analysis. The estimated features may then correspond to one or more of the predetermined classes of difficult item. For example, even without making an exact determination of an item, a coarse analysis may determine that the item has an awkward shape or large size, which corresponds to a bulky item class of items. Thus, the system may make a difficulty determination based on the coarse analysis and/or use the coarse analysis to help complete the visual identification of the item.

At block 1025, a level of difficulty for completing the checkout transaction is determined based on the one or more identified items. The transaction difficulty level may be a binary determination or may include multiple levels of difficulty. The transaction difficulty level may be based on the items' inclusion in one or more predetermined classes of "difficult" items and/or a composite of difficulty scores for the one or more identified items.

At block 1035, a level of assistance to provide to the person during the checkout transaction is determined. The level of assistance may be based on the person's experience and/or proficiency, staffing levels at the checkout area including the proficiency of assigned employees. In some embodiments, the determined level of assistance is provided through adjusting personnel assignments. In some embodiments, the determined level of assistance is provided through interactive assistance at a self-checkout terminal or a mobile computing device associated with the person. Method 1000 is completed following block 1035.

Figure 11:
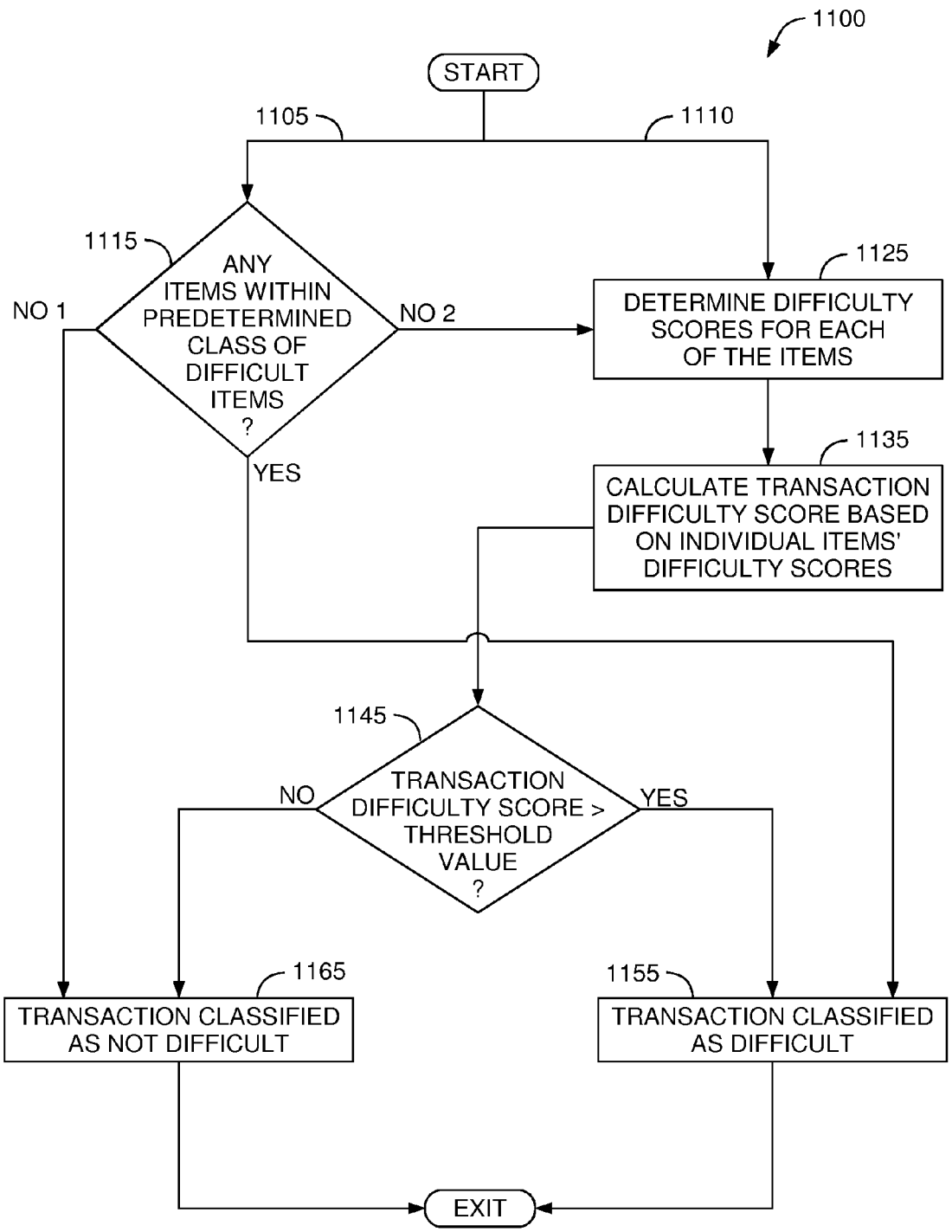
FIG. 11 illustrates a method of determining a level of difficulty of completing a checkout transaction, according to one embodiment.

FIG. 11 illustrates a method of determining a level of difficulty of completing a checkout transaction, according to one embodiment. The method 1100 may be performed as part of block 1025 of method 1000, described above.

Method 1100 begins along branch 1105 or alternatively along branch 1110. In one embodiment, method 1100 proceeds along branch 1105 to block 1115. At block 1115, the system determines whether any of the one or more identified items are included within a predetermined class of difficult items. Some examples of classes of "difficult" items include large or bulky items, loose items such as produce, items requiring additional interactions with the person, such as a verification of the person's age or offering a warranty/service plan for the items, and so forth.

In one embodiment, if none of the one or more identified items are included in a class of "difficult" items, the method proceeds along branch NO 1 to block 1165 where the transaction as a whole is classified as "not difficult." In another embodiment, if none of the one or more identified items are included in a class of "difficult" items, the method proceeds along branch NO 2 to block 1125 to determine a difficulty level of the transaction. At block 1125, difficulty scores are determined for each of the one or more identified items. In some embodiments, the difficulty scores may be pre-calculated during the person's transaction within the environment and prior to the checkout transaction, such as at the time of selecting items. Pre-calculated values may be associated with some or all items that have been added to a virtual cart associated with the person during their transaction in the environment.

Based on the determined individual item difficulty scores, at block 1135 the transaction difficulty score is calculated. Any suitable algorithm may be used to composite the individual difficulty scores, such as a sum, a weighted sum, and so forth. In some embodiments, the items having larger difficulty scores are weighted more heavily in determining the transaction difficulty score. At block 1145, if the transaction difficulty score meets a threshold value (Y), the transaction is classified as difficult in block 1155. If the transaction difficulty score does not meet the threshold value (N), the transaction is classified as not difficult in block 1165.

In one alternative embodiment, even if at least one of the one or more identified items is included in one or more classes of "difficult" items, the method proceeds along branch N2 to blocks 1125, 1135 to calculate a transaction difficulty score. As shown, the transaction classification is a binary decision: difficult (block 1155) or not difficult (block 1165). Consistent with the descriptions provided herein, the person of ordinary skill will understand that other embodiments may use multiples levels or tiers of difficulty to consequently determine an appropriate level of assistance to provide to a person.

Figure 12:
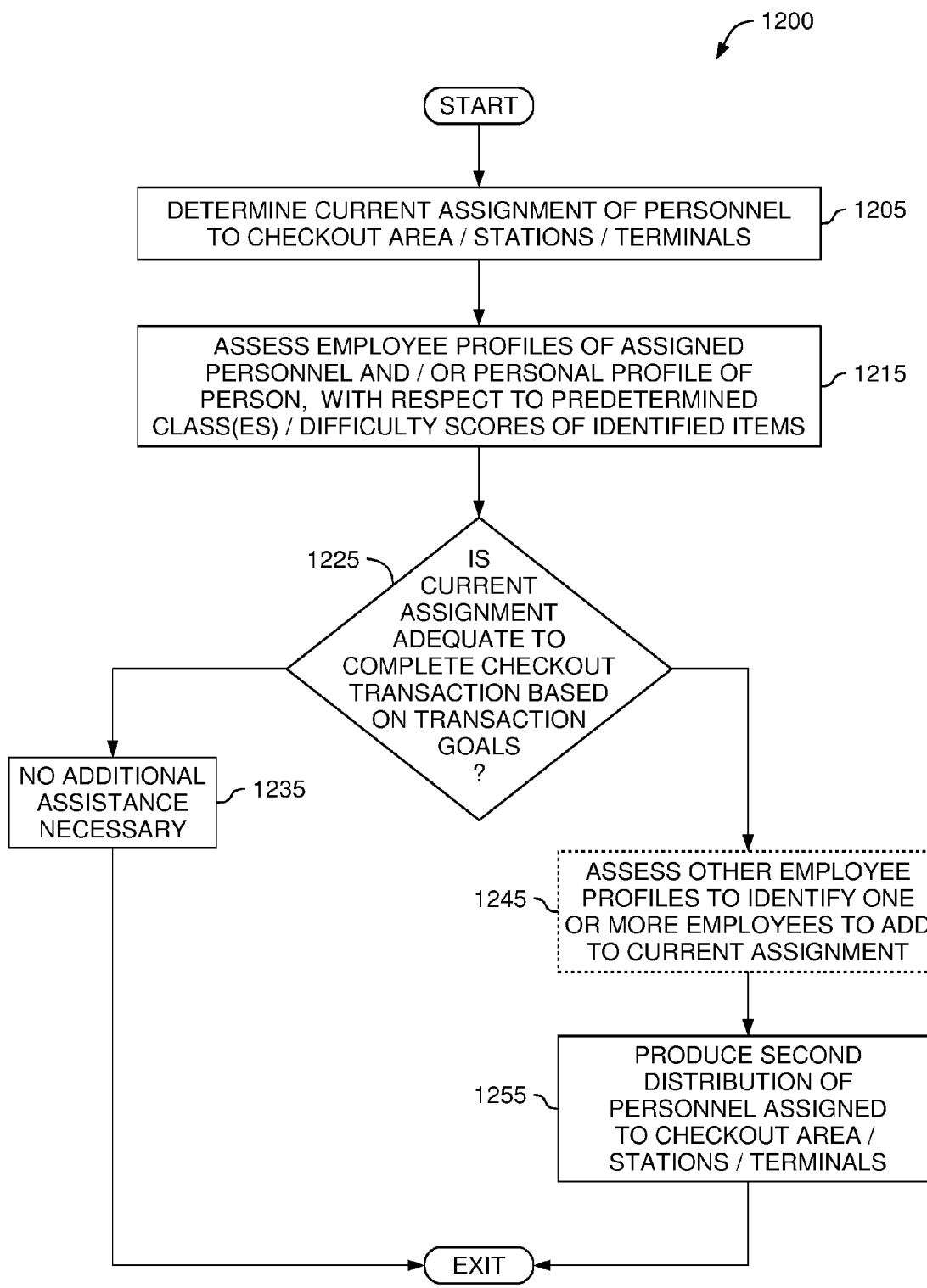
FIG. 12 illustrates a method of determining whether to provide additional assistance to a person during a checkout transaction, according to one embodiment.

FIG. 12 illustrates a method of determining whether to provide additional assistance to a person during a checkout transaction, according to one embodiment. The method 1200 may be performed as part of block 1035 of method 1000, described above.

Method 1200 begins at block 1205, where the system determines a current assignment of personnel to the checkout area (or checkout stations/terminals). The current assignment is stored in memory and may include several possible assignment positions for the checkout lane or station, or the checkout area. Determining the current assignment may include identifying one or more employees currently assigned to a particular position.

At block 1215, the system assesses employee profiles for the assigned personnel and/or the personal profile of the person with respect to the predetermined class(es) or difficulty scores for the one or more identified items. In some embodiments, the assessment determines the relative proficiency of the employees and of the person to handle the identified items during the checkout transaction.

At block 1225, the system determines whether the current assignment of employees is adequate to complete the checkout transaction based on specified transaction goals. The determination is based on the assessment performed of block 1215. Some non-limiting examples of transaction goals include completing checkout transactions with fewer than a particular number of errors, in less than a particular amount of time, and so forth. Historical throughput data compiled for the employees may be assessed in view of the transaction goals.

If the system determines that the current assignment of employees is adequate, the method proceeds along branch Y to block 1235 ("No additional assistance necessary"). If, however, the current assignment is inadequate, the method proceeds along branch N. Optionally, at block 1245 the system assesses other employee profiles (i.e., for employees not currently assigned to the checkout area) to identify one or more employees to add to the current assignment. In some cases, scores, ratings, or throughput data for the employees is evaluated relative to a particular deficiency with the current assignment in light of the transaction goals. For example, an assigned employee is deficient with bagging items, which slows the checkout throughput rates. Other employees may be evaluated based on their rating for bagging items to remedy the deficiency and thereby increase throughput rates consistent with transaction goals. Of course, if the transaction goals do not include increase throughput rates, employee proficiency in bagging items may be less relevant.

At block 1255, a second assignment distribution is produced for the checkout area. In some embodiments, the second assignment distribution includes newly assigned employees (i.e., the optional block 1245). In some embodiments, the second assignment distribution does not change the employees assigned to the checkout area, but redistributes one or more of the assigned employees already assigned to the checkout area.

In some embodiments, the method 1200 is performed reactively to identifying an imminent checkout transaction, so that the second assignment distribution is adaptively generated based on the identified checkout transaction. In other embodiments, the method 1200 may be performed prospectively, such as by estimating times for checkout transactions for persons currently in the environment, and forecasting assignments based on the estimated times.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module," or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present disclosure, a user may access applications (e.g., a retail store app for a mobile computing device) or related data (e.g., compiled shopping data) available in the cloud. Doing so allows a user to access this information from any computing system attached to a network connected to the cloud (e.g., the Internet).

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method to facilitate a checkout transaction for a person within an environment having a plurality of items, the method comprising:
   determining, using a visual sensor disposed within the environment, image information associated with the person;
   analyzing the image information to identify one or more of the plurality of items that are selected by the person to be presented during the checkout transaction;
   determining, based on a combination of difficulty scores associated with each of the one or more identified items, a level of difficulty of completing the checkout transaction; and
   determining, based on the determined level of difficulty of completing the checkout transaction, a level of assistance to provide to the person during the checkout transaction.

2. The method of claim 1, wherein identifying the one or more selected items includes at least one of:
   identifying items carried by the person, and
   identifying items disposed within a shopping receptacle associated with the person.

3. The method of claim 2, wherein the visual sensor is configured to determine image information at a predetermined location proximate to a checkout terminal.

4. The method of claim 1, wherein determining the level of difficulty of completing the checkout transaction further includes determining whether any of the one or more identified items are included within a predetermined class of difficult items, the predetermined class including at least one of loose items, bulky items, and numerous items.

5. The method of claim 1, further comprising:
   based on the determined level of assistance to be provided to the person during the checkout transaction, changing a current assignment distribution of employees assigned to handling checkout transactions to produce a second assignment distribution.

6. The method of claim 5, wherein determining the level of assistance to the person is further based on a respective proficiency score corresponding to each of the employees included in the current assignment distribution.

7. The method of claim 1, further comprising:
calculating a transaction difficulty score based on the combination of difficulty scores associated with each of the one or more identified items; and
comparing the transaction difficulty score with a predetermined threshold value,
wherein determining the level of difficulty of completing the checkout transaction is based on the comparison.

8. The method of claim 1, further comprising:
accessing a personal profile associated with the person; and
determining, using information included in the personal profile, one or more proficiency scores for the person,
wherein determining the level of assistance to provide to the person during the checkout transaction is further based on the determined one or more proficiency scores.

9. The method of claim 8, wherein determining the level of difficulty of completing the checkout transaction further comprises:
determining whether any of the one or more identified items are included within a predetermined class of difficult items, the predetermined class including at least one of loose items, bulky items, and numerous items,
wherein the determined one or more proficiency scores for the person correspond to the predetermined class.

10. A computer program product to facilitate a checkout transaction for a person within an environment having a plurality of items, the computer program product comprising:
a non-transitory computer-readable storage medium having computer-readable program code embodied therewith, the computer-readable program code executable by one or more computer processors to perform an operation that includes:
determining, using a visual sensor disposed within the environment, image information associated with the person;
analyzing the image information to identify one or more of the plurality of items that are selected by the person to be presented during the checkout transaction;
determining, based on a combination of difficulty scores associated with each of the one or more identified items, a level of difficulty of completing the checkout transaction; and
determining, based on the determined level of difficulty of completing the checkout transaction, a level of assistance to provide to the person during the checkout transaction.

11. The computer program product of claim 10, wherein identifying the one or more selected items includes at least one of:
identifying items carried by the person, and
identifying items disposed within a shopping receptacle associated with the person.

12. The computer program product of claim 11, wherein the visual sensor is configured to determine image information at a predetermined location proximate to a checkout terminal.

13. The computer program product of claim 10, wherein determining the level of difficulty of completing the checkout transaction further includes determining whether any of the one or more identified items are included within a predetermined class of difficult items, the predetermined class including at least one of loose items, bulky items, and numerous items.

14. The computer program product of claim 10, wherein the operation further includes:
based on the determined level of assistance to be provided to the person during the checkout transaction, changing a current assignment distribution of employees assigned to handling checkout transactions to produce a second assignment distribution.

15. The computer program product of claim 14, wherein determining the level of assistance to the person is further based on a respective proficiency score corresponding to each of the employees included in the current assignment distribution.

16. A system to facilitate a checkout transaction for a person within an environment having a plurality of items, the system comprising:
one or more computer processors;
at least a first visual sensor disposed within the environment and communicatively coupled with the one or more computer processors; and
a memory containing program code which, when executed by the one or more computer processors, performs an operation that includes:
determining, using the first visual sensor disposed within the environment, image information associated with the person;
analyzing the image information to identify one or more of the plurality of items that are selected by the person to be presented during the checkout transaction;
determining, based on a combination of difficulty scores associated with each of the one or more identified items, a level of difficulty of completing the checkout transaction; and
determining, based on the determined level of difficulty of completing the checkout transaction, a level of assistance to provide to the person during the checkout transaction.

17. The system of claim 16, wherein identifying the one or more selected items includes at least one of:
identifying items carried by the person, and
identifying items disposed within a shopping receptacle associated with the person.

18. The system of claim 17, wherein the visual sensor is configured to determine image information at a predetermined location proximate to a checkout terminal.

19. The system of claim 16, wherein determining the level of difficulty of completing the checkout transaction further includes determining whether any of the one or more identified items are included within a predetermined class of difficult items, the predetermined class including at least one of loose items, bulky items, and numerous items.

20. The system of claim 16, wherein the operation further includes:
based on the determined level of assistance to be provided to the person during the checkout transaction, changing a current assignment distribution of employees assigned to handling checkout transactions to produce a second assignment distribution,
wherein determining the level of assistance to the person is further based on a respective proficiency score corresponding to each of the employees included in the current assignment distribution.

* * * * *